United States Patent [19]

Yamahaka

[11] Patent Number: 4,770,261
[45] Date of Patent: Sep. 13, 1988

[54] WEIGHING DEVICE
[75] Inventor: Masami Yamahaka, Miki, Japan
[73] Assignee: Yamato Scale Company, Limited, Japan
[21] Appl. No.: 28,721
[22] Filed: Mar. 23, 1987
[30] Foreign Application Priority Data
  May 7, 1986 [JP] Japan .................. 61-105571
[51] Int. Cl.⁴ .................. G01G 23/10; G01G 3/14
[52] U.S. Cl. .................. 177/185; 177/210 FP
[58] Field of Search .................. 177/185, 210 FP
[56] References Cited

U.S. PATENT DOCUMENTS 3,766,472 10/1973 Whitney .................. 177/210 FP X
3,885,427 5/1975 Melcher et al. .......... 177/210 FP X
4,230,196 10/1980 Snead .................... 177/210 FP X
4,390,075 6/1983 Snead .................... 177/210 FP
4,503,922 3/1985 Brosh et al. ............. 177/210 FP X

FOREIGN PATENT DOCUMENTS 55-1578 1/1980 Japan .

Primary Examiner—George H. Miller, Jr.
Attorney, Agent, or Firm—Senniger, Powers, Leavitt and Roedel

[57] ABSTRACT

A weighing device of a type wherein a vibrating weight indicative signal is integrated and averaged by arithmetic means and the resultant weight is digitally displayed, with the arithmetic means being improved in accordance with the invention by providing means for calculating the period of vibration of the associated vibrating system to determine the integration time from the calculated vibration period, thereby minimizing the measuring error attributable to a variation in the vibration period with the weight of product to be weighed.

12 Claims, 1 Drawing Sheet

WEIGHING DEVICE

BACKGROUND OF INVENTION

This invention relates to a weighing device, especially to such device wherein the weight signal produced from a loaded weigher initially oscillates (vibrates) and the period of this oscillation or vibration functionally relates to the load on the weigher.

Japanese opened patent gazette No. 55-1578 discloses a weighing device which is used as a table digital balance or a market weigher. In this device, as schematically shown in FIG. 4, a product 2 is weighed by a weigher 1 which includes a weight sensor of the electric resistance load cell or force balance type, for example, which produces an analog electric signal indicative of the weight of product 2. This signal is amplified by an amplifier 3 and converted by a time integration A/D convertor 21 into a digital signal which is displayed as a weight value by a digital display 22.

The A/D convertor 21 is operable to integrate the analog signal from the amplifier 3 for a predetermined length of time T and to divide the result of integration by the time T to obtain a digital value. The weigher 1 generally includes an elastic vibration system, such as spring, and produces a vibrating or oscillating weight indicative signal when it is initially loaded. The period of this oscillator varies with the weight of product 2 on the weigher 1. Therefore, the ratio of the above-specified integration time to the period of oscillation varies with the weight of product 2 and this results in undesirable measurement errors.

More specifically, assume now that the oscillation or vibration of the weigher 1 is sinusoidal and that the analog electric signal e output from the amplifier 3 is given as follows:

$$e = W + a \sin \omega t,$$

$$\omega = 2\pi/\tau$$

where W is the weight of product 2, a is the amplitude of vibration and $\tau$ is the vibration period, as shown in FIG. 2. Then, the integrated and averaged signal from the A/D convertor 21 includes an error E as follows:

$$E = (a/T \int^T \sin \omega t \cdot dt$$

As is also obvious from FIG. 2, this value is zero for the value of T equal to the vibration period $\tau$ or its integral multiple at time points such as t1, t2 and t3 when integration starts at time t0, while it is not zero for other value of T. When the integration time T is fixed as in the prior art device, therefore, there is little chance that the error E will be zero. Accordingly, in the prior art devices, it is necessary to effect the integration in a time interval as shown by B in FIG. 3 where the vibration has substantially decayed, avoiding a vibration interval as shown by A. As a result, the weighing operation of the prior art devices is very time consuming.

SUMMARY OF INVENTION

Accordingly, an object of this invention is to solve the abovementioned problem of residual error E in the output of the prior art time integration A/D convertor.

According to this invention, an A/D convertor includes means responsive to a current weight of product for calculating a time interval equal to the period of natural vibration of the weigher or its integral multiple, and means for integrating the weight signal from the weigher with an integration interval equal to the calculated time interval. Accordingly, the above-mentioned error E is always zero even in the vibrating interval A (FIG. 3) and it becomes possible to obtain accurate measurement within a minimum time.

DESCRIPTION OF THE INVENTION

Figure 1:
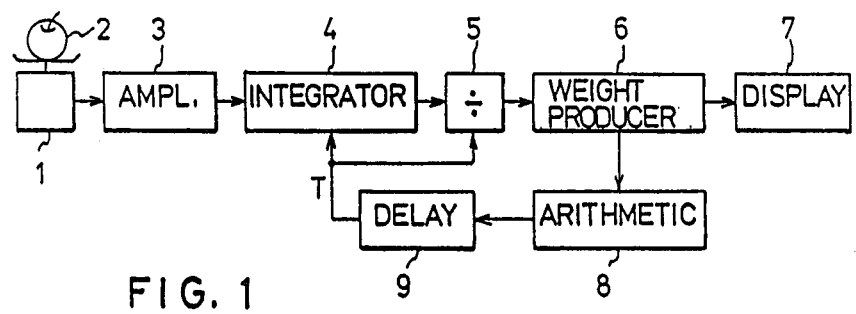
FIG. 1 is a block diagram representing a circuit configuration of the weighing device of this invention.
Figure 2:
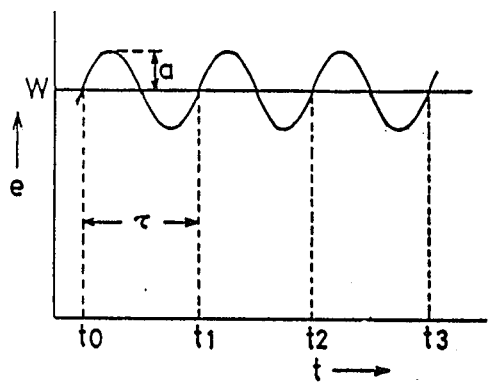
FIGS. 2 and 3 are waveform diagrams given to aid in the explanation of the invention.
Figure 3:
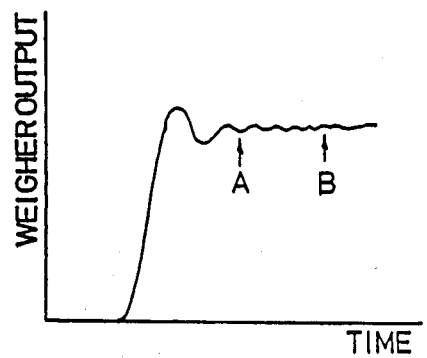
Figure 4:
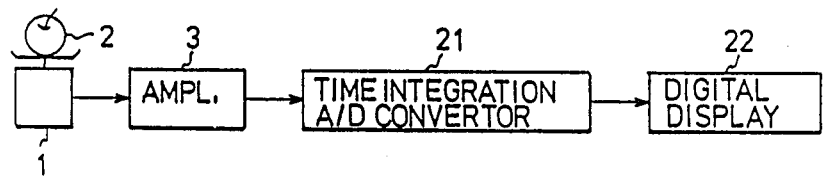
FIG. 4 is a block diagram representing a cuicuit configuration of the prior art weighing device referred to above.

Now, a description of an embodiment of a weighing device of this invention will be made with reference to FIG. 1. In the drawing, weigher 1 and amplifier 3 are identical to those of the prior art shown in FIG. 4. The vibration system of weigher 1 can be considered as a mechanical spring having a spring constant k supporting a weighing cradle having weight m loaded with product having weight Mx. The vibration (oscillation) period of the system can be given as follows:

$$\tau = 2\pi \sqrt{(m + Mx)/k \cdot g}$$

where g is acceleration of gravity.

The output of amplifier 3 is applied to an integrator 4 which operates to integrate the analog input signal e for a preset time interval T. As a feature of this invention, the value of T is set to be equal to the value of $\tau$ or its integral multiple as calculated by the above equation on the basis of the current weight measurement Mx. The result of integration is applied to a divider 5 and divided by T which is calculated as described below. The average output of divider 5 is applied to a weight producer 6 which effects tare compensation and other suitable processing to provide a value of Mx which is then displayed by a display 7.

An arithmetic unit 8 is arranged to calculate the integration period T based upo the output Mx of weight producer 6. As aforementioned, the value T is equal to $n\tau$ (n=1,2, ... ). The calculated value T is suitably delayed by a delay line 9 and applied to the integrator 4 and divider 5.

When the weigher 1 is unloaded at the beginning of operation, the arithmetic unit 8 calculates the value T with the above equation where Mx=0, namely $T_0 = 2n\pi \sqrt{m/k \cdot g}$. When the weigher 1 is first loaded with product of weight M1, this value $T_0$ is used for the averaging process in the comcomponents 4 and 5. Therefore, there will be an error due to incoincidence of the value of Mx in this first measurement. However, when the second measurement is effected with product of weight M2, the average is calculated with a value T equal to $T_1 = 2n\pi \sqrt{(m + M1)/k \cdot g}$. Therefore, the possible error will be minimal unless values M1 and M2 differ extremely. Similarly, each succeeding measurement for each successive weighment is effected with the value T calculated by the above equation using the weight of product of the preceding measurement in the preceding weighment.

I claim:

1. A weighing device for weighing a series of quantities of product, said device comprising a weighing unit having a natural vibration period varying with the weight of each quantity of product to be weighed and being operable to produce an electrical signal corresponding to said weight and varying according to said natural vibration period corresponding to the weight, an integrator for integrating said electrical signal for a preset time interval, and a calculating unit for processing the result of said integration during said preset time interval to provide a measured weight; characterized in that said device further comprises means for calculating a specific time interval having a value equal to said natural vibration period or an integral multiple thereof corresponding to one of said quantities of product and means for applying said value to said integrator for use as the preset time interval and to said calculating unit for use in providing a measured weight for a successive quantity of product.

2. The device of claim 1 wherein the means for calculating a specific time interval comprises an arithmetic unit.

3. The device of claim 1 wherein the means for applying comprises a delay line for delaying the calculated specific time interval until the succeeding weighment.

4. The device of claim 1 wherein the calculating unit comprises a divider for averaging the integrated electrical signal by the specific time interval.

5. A weighing method for obtaining a weight of a series of quantities of product from a vibrating weight indicative signal having a period of vibration varying with the weight of each quantity of product, comprising calculating a specific time interval as a value equal to said vibration period or an integral multiple thereof corresponding to the weight of the quantity of product obtained in a preceding weighment, integrating said signal for said specific time interval, and averaging the result of integration by said specific time interval.

6. The method of claim 5 further including the step of delaying the use of the calculated specific time interval used for integrating the signal until a weighment succeeding the preceding weighment.

7. A method for weighing a series of quantities of product comprising the steps of:

producing a signal by a weighing unit wherein the signal corresponds to the weight of each quantity of product and varies according to a natural vibration period of the weighing unit corresponding to the weight;

calculating a preset time interval having a value equal to said natural vibration period or an integral multiple thereof corresponding to a previous one of said quantities of product;

integrating the signal for the preset time interval; and calculating the weight corresponding to the integrated signal.

8. The method of claim 7 further including the step of delaying the use of the calculated specific time interval used for integrating the signal until a weighment succeeding the preceding weighment.

9. A weighing device for weighing a series of quantities of product comprising:

means for weighing each quantity and for producing a signal corresponding to the weight and varying according to a natural vibration period corresponding to the weight;

means for calculating a specific time interval having a value equal to said natural vibration period or an integral multiple thereof corresponding to a previous one of said quantities of product;

means for integrating the signal for the specific time interval; and means for calculating the weight corresponding to the integrated signal.

10. The device of claim 9 wherein the means for calculating a specific time interval comprises an arithmetic unit.

11. The weighing device of claim 9 wherein the means for integrating comprises an integrator and further comprising a delay line for delaying the calculated specific time interval until the succeeding weighment.

12. The weighing device of claim 9 wherein the means for calculating the weight comprises a divider for averaging the integrated signal by the specific time interval.

* * * * *